US006750867B1

(12) United States Patent
Gibson

(10) Patent No.: US 6,750,867 B1
(45) Date of Patent: Jun. 15, 2004

(54) IMAGE PROCESSING APPARATUS

(75) Inventor: Cliff Gibson, Hemel Hempstead (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 09/831,386

(22) PCT Filed: Nov. 8, 1999

(86) PCT No.: PCT/GB99/03716

§ 371 (c)(1),
(2), (4) Date: May 4, 2001

(87) PCT Pub. No.: WO00/28477

PCT Pub. Date: May 18, 2000

(30) Foreign Application Priority Data

Nov. 6, 1998 (GB) ............................................. 9824406

(51) Int. Cl.$^7$ ............................................. G06F 15/00
(52) U.S. Cl. ....................... 345/501; 345/503; 345/506; 345/418
(58) Field of Search ................................. 345/418, 501, 345/422, 502, 505

(56) References Cited

U.S. PATENT DOCUMENTS

| 5,008,838 A | * | 4/1991 | Kelleher et al. | ............. | 345/422 |
| 5,729,672 A | * | 3/1998 | Ashton | ........................ | 345/589 |
| 6,313,841 B1 | * | 11/2001 | Ogata et al. | ................. | 345/424 |

FOREIGN PATENT DOCUMENTS

| GB | 2 226 937 | 7/1990 |

OTHER PUBLICATIONS

Kawai T. et al: "Evaluation of Parelle Ray Tracing Algorithm Using Screen Space Subdivision for Image Generation System Magg" Systems & Computers in Japan, US, Scripta Technica Journals, New York, vol. 25, No. 11, Oct. 1994, pp. 78–86.

Coppen D. et al: "A Distribued Frame Buffer for Rapid Dynamic Changes to 3D Scenes" Computers and Graphics, GB, Pergamon Press Ltd. Oxford, vol. 19, No. 2, Mar. 1995, p. 247–250.

* cited by examiner

Primary Examiner—Michael Razavi
Assistant Examiner—Faranak Fouladi
(74) Attorney, Agent, or Firm—Flynn, Thiel, Boutell & Tanis, P.C.

(57) ABSTRACT

Image processing apparatus (60) for rendering (i.e. coloring, texturing or shading) an image includes a tiling device (66) which divides the image into sub-regions or tiles. Two rendering devices (70A, 70B) are provided, and the tiles are allocated so that some are processed by one rendering device and some by the other. Polygons representing surfaces of objects to be displayed are tested against the tiles. If the surface falls into one sub-region only, the data is sent to one rendering device only. On the other hand, if the surface falls into two sub-regions being handled by the different rendering devices, then the data is sent to both rendering devices. The result is that a substantial proportion of the data need only be supplied to and processed by one rendering device, thereby speeding the operation of the apparatus. The outputs of the two rendering devices (70A, 70B) are subsequently combined by tile interleaving and image display circuitry (72).

14 Claims, 4 Drawing Sheets

☐ DEVICE A TILES

▨ DEVICE B TILES

☐ DEVICE A TILES (INCLUSION R1, EXCLUSION R2)
▓ DEVICE B TILES (INCLUSION R1)

IMAGE PROCESSING APPARATUS

BACKGROUND OF THE INVENTION

This invention relates to apparatus for the processing of images.

The invention is particularly, though not exclusively, suitable for use in systems for the real-time rendering, texturing or shading of three-dimensional (3D) images. Real-time here means sufficiently quickly for the image to be displayed without appreciable perceptible delay to the viewer.

The best known existing system for generating real-time 3D images is the Z-buffer (or depth buffer) image precision algorithm. The Z-buffer algorithm requires a frame buffer in which color values are stored for each pixel (elementary picture element) in an image. In addition to this it requires a Z-buffer with an entry for each pixel. In this Z-buffer, a Z value or depth value is stored for each pixel. To generate a 3D representation, polygons are rendered into the frame buffer in arbitrary order. As a subsequent polygon is entered into the frame buffer, if a point on the polygon is nearer to the viewer than the point already in the frame buffer for that pixel, then the new point's color and Z value replace the previously-stored values. If texture or shading of the polygon is desired, the texturing or shading is applied to the polygon before it is rendered into the frame buffer. The system is fed with a list of vertices which define the polygons, and texture and shading operations are performed on each polygon before a depth test is executed. The performance of such systems is limited by various factors, including the input data bandwidth, the speed of texturing and shading, and the local memory interface bandwidth. It has been proposed to improve the system performance by the use of dual rendering devices, which are 'scan line interleaved'. That is, there are two processors which process alternate scanlines of the image raster, thus sharing the processing between them.

Another system for generating real-time 3D images is described in United States Patent U.S. Pat. No. 5,729,672 assigned to VideoLogic Limited. This system uses a 'ray-casting' technique for the rendering of three-dimensional images rather than conventional polygon-based rendering techniques. In this system, objects are each represented by a set of surfaces which are stored as sets of data. An image plane is deemed to lie between a viewer and the scene to be viewed, and this image plane is composed of a plurality of pixels. A ray is assumed to pass from the viewpoint through a pixel of the screen into the scene to be viewed and will intersect various surfaces which represent objects in the scene. By analysis of these intersections and their distances from the viewer, the system can determine whether any surface is visible. If it is visible, that surface is then textured or shaded as desired. However if the surface is not visible, texturing and shading of the surface is not necessary. One advantage of this system over the Z-buffer is that non-visible surfaces do not have to be textured or shaded.

Texturing or shading of images requires a great deal of processing power. The reduction in processing achieved by the system of the above-mentioned United States Patent is therefore very useful, and can be quite dramatic with certain types of image, particularly those having many overlapping polygons or surfaces.

In the system of the United States Patent, the surfaces defining an object are assumed to extend across the whole of the image plane, that is to say they are 'infinite' in extent. Also, each surface is defined as being a forward surface, if it is at the front of the object and thus faces towards the observer, or a reverse surface if it forms part of the back of the object and thus faces away from the observer. To determine whether any given object is visible at any given pixel, in the ray-casting technique, a comparison is made of the distances from the observation point to (a) the forward surface intersection with the ray which is furthest from the observation point and (b) the reverse surface intersection with the ray which is closest to the observation point. If (a) is greater than (b), then, as illustrated in the Patent, that indicates that the ray does not intersect with that object, and thus that that particular object is not visible at the pixel in the image plane through which the ray passes. With this technique, the edges of the surfaces do not have to be defined or calculated as such; it is sufficient to know the vertices of the object as a whole and to calculate the planes occupied by the surfaces. It will be appreciated that the technique requires that every object is checked for every pixel in the image plane to determine whether or not that object is visible at that location.

As described in that patent, the technique makes it particularly easy to apply shadows to appropriate parts of the image. The system is also able to deal with transparency which can take various forms.

The technique has advantages over the Z-buffer system, but nevertheless processing requirements can still be a constraint. It is proposed in the Patent to improve performance by subdividing the image plane or screen into a plurality of sub-regions or 'tiles'. The tiles are conveniently rectangular (including square). Then for each tile, those objects having surfaces which could fall within the tile are first determined, and only those objects within the tile are processed, thus decreasing the number of surfaces to be processed. The determination of which objects could contribute to each tile may be achieved by surrounding the object with a bounding volume, namely a cuboid which fully contains the object, and comparing the tile area with the bounding volume. To do this, all the bounding volumes are projected onto the image plane and are tested against the corners of the tiles. Those objects which have bounding surfaces which are completely outside the tile are discarded for that tile. Thus the number of surfaces which need to be processed per pixel within a tile becomes less, and hence the total time to render an image is reduced, since the total processing time for all the tiles will be reduced.

The United States Patent describes the use of tiles of variable size. This reflects the fact that objects are not normally evenly distributed over the entire screen. As shown in FIG. 1 of the drawings of the present application, three tiles 10 are 10 pixels square to accommodate three particular objects, and four tiles 12 are 5 pixels square to accommodate four smaller objects. The image portions for the several tiles are processed in pipeline fashion in a processing system as described in the patent.

We have appreciated that even despite all these features, processing power can still be a constraint, but can be improved by use of the present invention.

SUMMARY OF THE INVENTION

The invention in its various aspects is defined in the appended claims to which reference should now be made. Preferred features of the invention are set forth in the dependent claims.

A preferred embodiment of the invention is described in more detail below with reference to the drawings. Briefly, this preferred embodiment of the invention takes the form of image processing apparatus for rendering (i.e. coloring, texturing or shading) an image includes a tiling device which divides the screen into sub-regions or tiles. Two rendering devices are provided, and the tiles are allocated so that some are processed by one-rendering device and some by the other. Polygons representing objects to be displayed are tested against the tiles. If the surface falls into one sub-region only, the data is sent to one rendering device only. On the other hand, if the polygon falls into two sub-regions being handled by the different rendering devices, then the data is sent to both rendering devices. The result is that a substantial proportion of the data need only be supplied to and processed by one rendering device, thereby speeding the operation of the apparatus. The outputs of the two rendering devices are subsequently combined by tile interleaving and image display circuitry.

BRIEF DESCRIPTION OF THE DRAWINGS

The invention will now be described in more detail by way of example with reference to the accompanying drawings, in which.

DETAILED DESCRIPTION OF THE PREFERRED EMBODIMENTS

A method of and apparatus for image processing, more particularly for the real-time texturing or shading of three-dimensional (3D) images, will now be described with reference to FIG. 2 et seq. of the drawings.

The introduction above describes a "bounding volume" technique in which objects which have bounding volumes which are completely outside a tile are discarded for that tile. In the following description a specific implementation of this principle is used, namely it is assumed that objects are projected onto the screen or image plane, and their bounding surfaces as seen on that plane are compared with the tiles.

Figure 1:
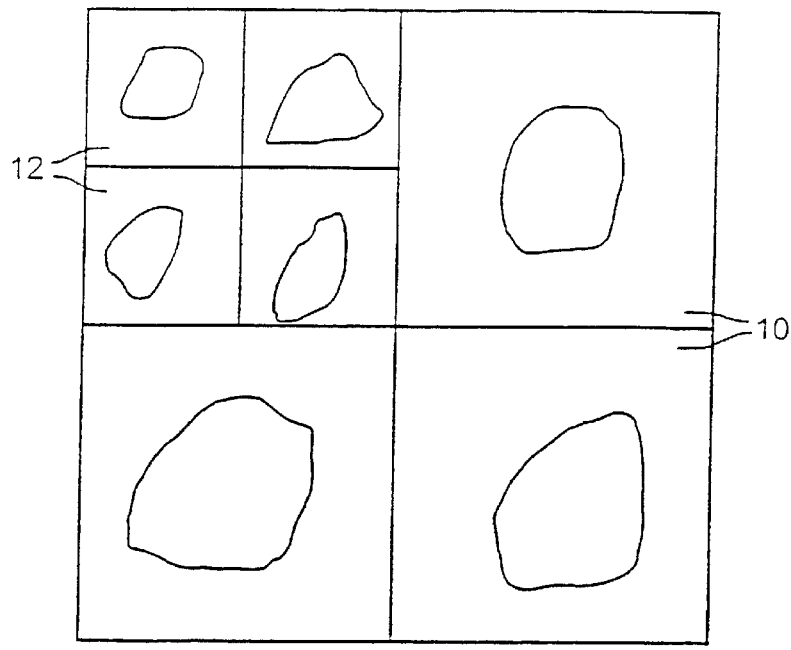
FIG. 1 illustrates an portion of an image plane containing several objects and having tiles of variable sizes, taken from U.S. Pat. No. 5,729,672.
Figure 2:
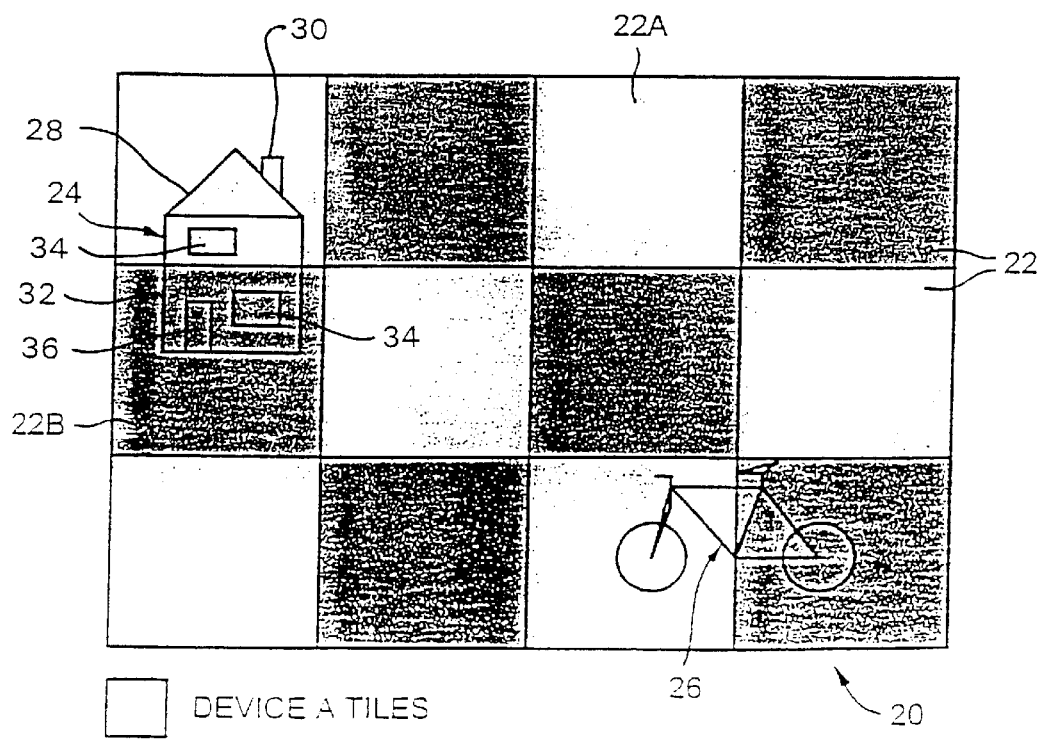
FIG. 2 illustrates a portion of the screen containing tiles in accordance with an embodiment of the present invention.

Referring first to FIG. 2, there is shown a portion 20 of a screen which contains twelve sub-regions or tiles 22 as shown. Each tile is typically 32 or 64 pixels square, that is, using a conventional raster scan, 32 or 64 pixels long by 32 or 64 lines high. It will be seen that two objects are diagrammatically shown on this Figure, namely a house 24 and a bicycle 26. Each of these objects extends, for the sake of illustration, over two of the tiles 22. In the case of the house 24 these are one above the other in the image, and in the case of the bicycle they are side by side. Either way the operation is the same.

The tiles are divided into two groups of tiles. As shown, the tiles are split into two groups in checkerboard fashion. As shown in FIG. 2, alternate tiles are shaded light or dark on the figure, with each light tile 22A being surrounded by four dark tiles and each dark tile 22B being surrounded by four light tiles. The light and dark tiles thus form diagonals across the screen.

In accordance with this invention, the rendering of the objects, that is to say the texturing and shading of the objects, which has hitherto been handled by a single processor, is split between two processors which may be referred to as processor A and processor B. Each group of tiles is associated with a respective one of the processors A and B. That is, all the light tiles 22A are associated with processor A and all the dark tiles 22B, as shown in FIG. 2, are associated with processor B. All the processing of surfaces which are seen in a light tile is undertaken by processor A and all the processing of surfaces which are seen in a dark tile is undertaken by processor B.

Complex objects can be seen to be made up of a group of several smaller objects. For example, the house 24 is made up of a triangle for the roof 28, a triangle and a square for the chimney 30, and rectangles for the main body 32 of the house, the windows 34, and the door 36.

Those objects which make up the roof 28, the chimney 30, and the upstairs one of the windows 34 lie entirely within a light tile 22A, and so need only be sent to processor or device A. The door 36 and the downstairs window 34 lie entirely within a dark tile 22B, and so need only be sent to processor or device B. However, the main body 32 of the house overlaps two tiles. Accordingly it must be sent to both processors or devices as it affects the display in both a light tile and a dark tile.

Similarly for the bicycle 26, the objects which make up the front wheel, the front forks and the handlebars are sent to device A only; the rear wheel, the rear forks and the saddle are sent to device B only; while the frame of the bicycle is sent to both devices. Larger objects may extend over three or more tiles, but the processing applied and its effects are the same as with objects that overlap just two tiles.

Figure 3:
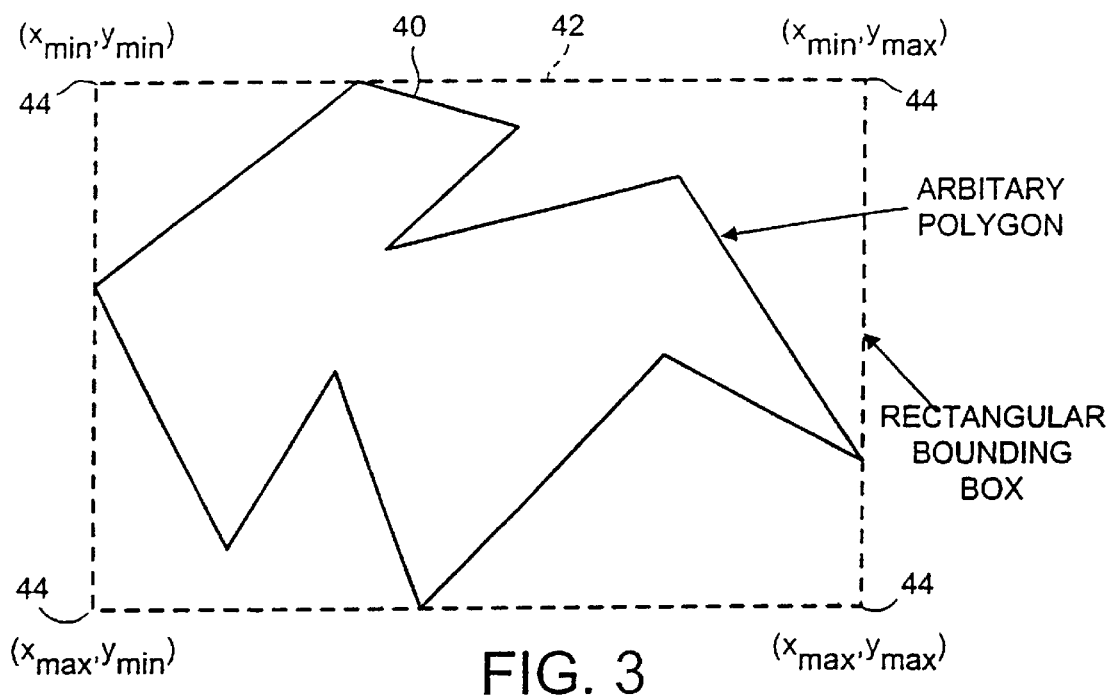
FIG. 3 is a diagram showing a bounding box around an object.

The extent of each of the objects which make up the complex object can be achieved by drawing a rectangle to enclose the entire object, and then testing the rectangle against the co-ordinates of the tiles of the screen to determine the extent of the object. This is illustrated in FIG. 3, which shows an arbitrary object 40. This object is shown as a re-entrant object and may conveniently be broken into non-re-entrant objects for processing, if desired, but the principle of establishing the bounding box is the same. Object data are supplied to the rendering device by giving the co-ordinates of each vertex of the object. The co-ordinates are given in a Cartesian system which has three orthogonal axes, X, Y and Z. The final display screen is assumed to be in the plane of the X-Y axes, while the Z axis represents the depth of the object, as is conventional. The procedure used to determine the minimum values of x and y which define the corners 44 of the bounding box 42 is illustrated in FIG. 4.

Figure 4:
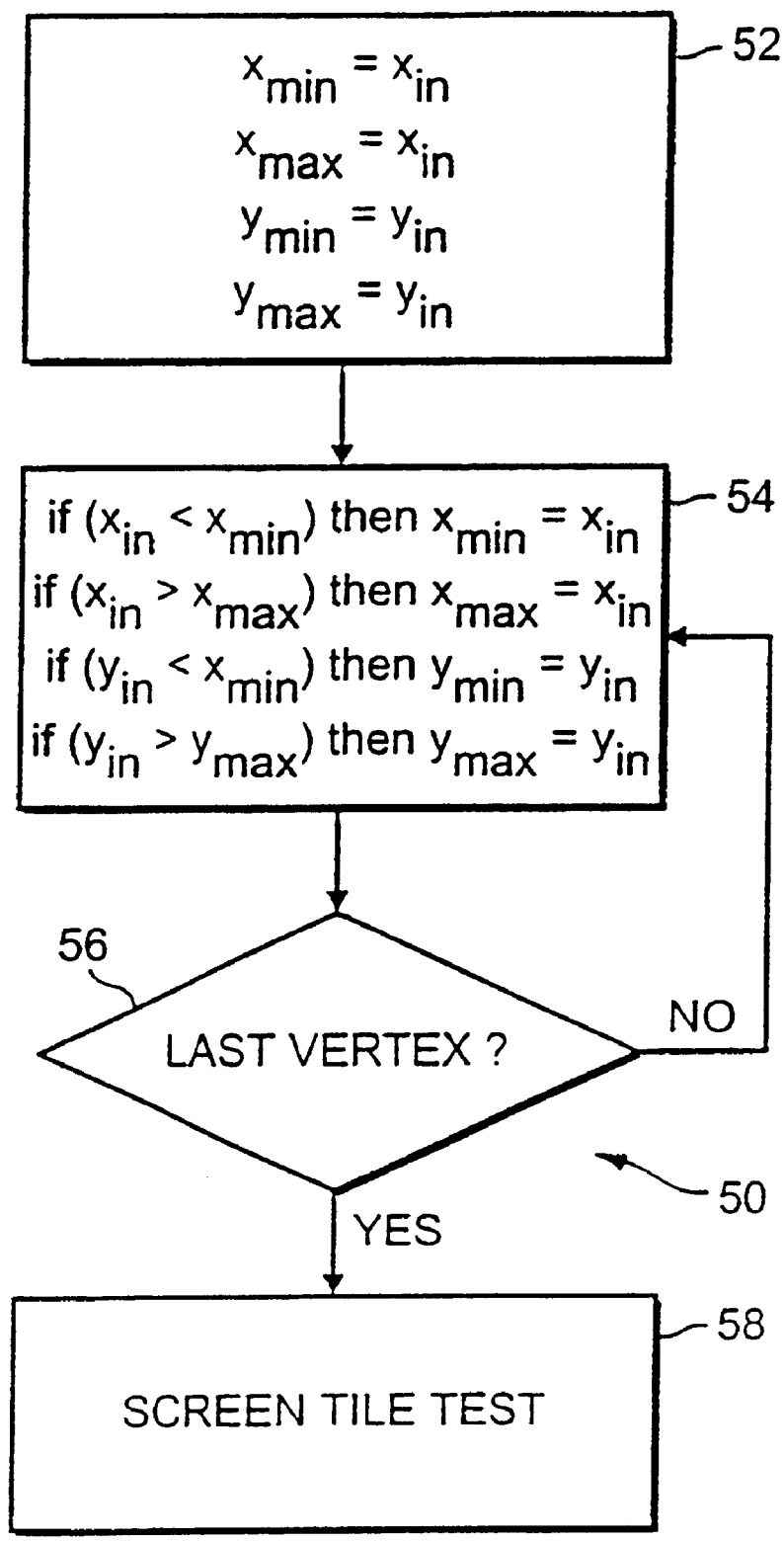
FIG. 4 is a flow chart of the procedure used to determine the co-ordinates of a bounding box around an object.

In the procedure 50 of FIG. 4, in a first step 52 the input values $x_{in}$, $y_{in}$ for the first vertex processed are initially assumed to be the desired values $x_{min}$, $x_{max}$, $y_{min}$, $y_{max}$. The next vertex is then processed in step 54. The new input values $x_{in}$, $y_{in}$, are compared with the stored values for $x_{min}$, $x_{max}$, $y_{min}$, $y_{max}$. If for either x or y the new input value is less than the stored minimum value then it replaces the minimum value, and if the new input value exceeds the maximum value it replaces the maximum value. The procedure then moves to step 56 where a check is made to see whether the last vertex defining the polygon has been processed. If not, the procedure returns to step 54 to process the next vertex. If it has, then the co-ordinates of the bounding box 42 have now been determined. If the coordinates of the bound box 44 have been determined, the procedure moves to step 58 where a determination is made to see whether the bounding box overlaps the screen tile which is being processed. This determination also is made by simple comparison of the XY co-ordinates of the corners 44 of the bounding box 42 with the XY co-ordinates of the corners of the tile. The tile size in terms of the number of pixels is preferably chosen to be a power of two, e.g. 32 or 64, which has the consequence that the screen tile test 58 reduces to a number of simple binary comparisons.

The bounding box procedure described will occasionally cause the system to indicate that a surface falls within a given tile when in fact it does not, but this is not a significant problem.

Figure 5:
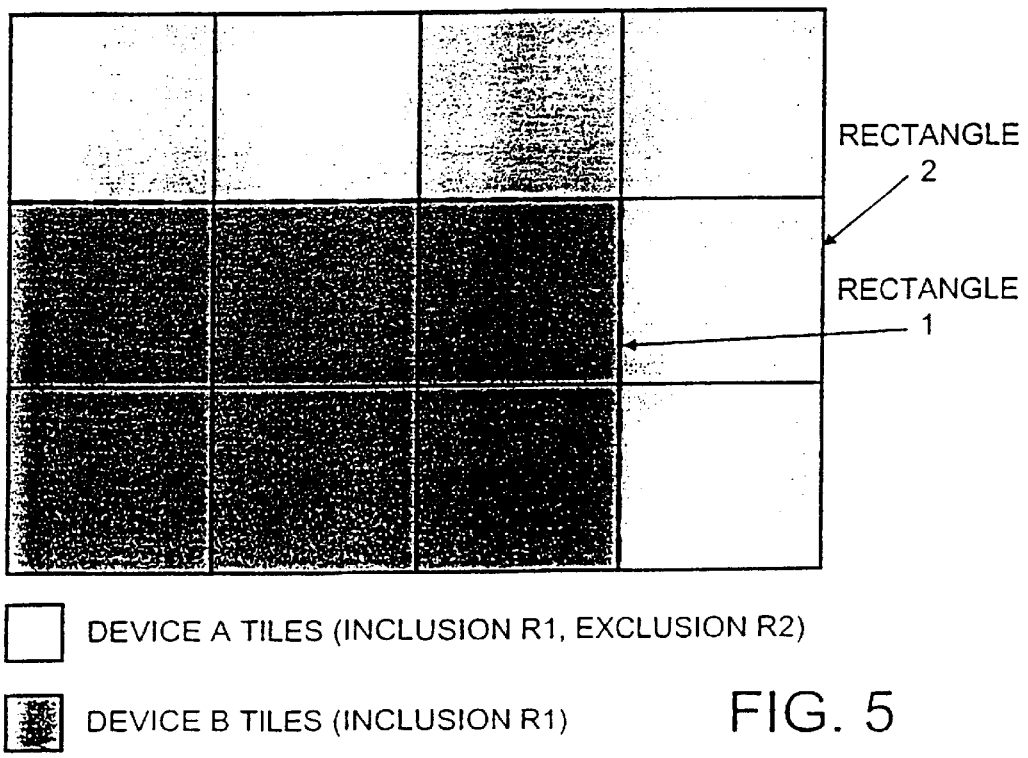
FIG. 5 illustrates a portion of the screen containing tiles in a modification of the embodiment of FIG. 1.

As described, the tiles have been divided between the two processors A and B in a checkerboard pattern. Other methods may however be used to divide up the screen. The optimal method will depend on the image content, and may mean that more tiles are processed by one processor than the other. FIG. 5 illustrates a form of division in which a large rectangle 2 contains a small rectangle 1 of shorter height and width. The device B is arranged to process the tiles forming the smaller rectangle 1, and the processor A is arranged to process what is left, that is rectangle 2 with rectangle 1 excluded. Rectangle 1 is thus defined for processor B as an inclusion rectangle and rectangle 2 as an exclusion rectangle. That is, all polygons entirely enclosed in rectangle 1 are sent to device A. Polygons outside rectangle 1 but inside rectangle 2 are sent to device A. Polygons which overlap the two areas are sent to both devices.

The division of the screen is such that a substantial number of surfaces have to be sent only to one processor. Thus the tiles are square or rectangular. If the title are rectangular, it is preferred that one side not more than twice or three times the length in pixels of the other, so that there is a reasonable likelihood that a good proportion of the surfaces will fall only in one tile. In this way the processing is reduced by some surfaces having to be sent to one processor only. Thus, a split in which alternate scan-lines were processed by different processors would not provide any advantage because the number of surfaces which fall only on one scanline is zero, or close to it. Another possible split would be in horizontal bands across the screen, but the bands would have to be sufficiently wide, e.g. the screen as a whole might be split into three or four bands. Then the tile aspect ratio is less than six to one. In any event, there will normally be at least three screen areas, with at least one of the processors being arranged to process at least two discrete separate image areas.

Figure 6:
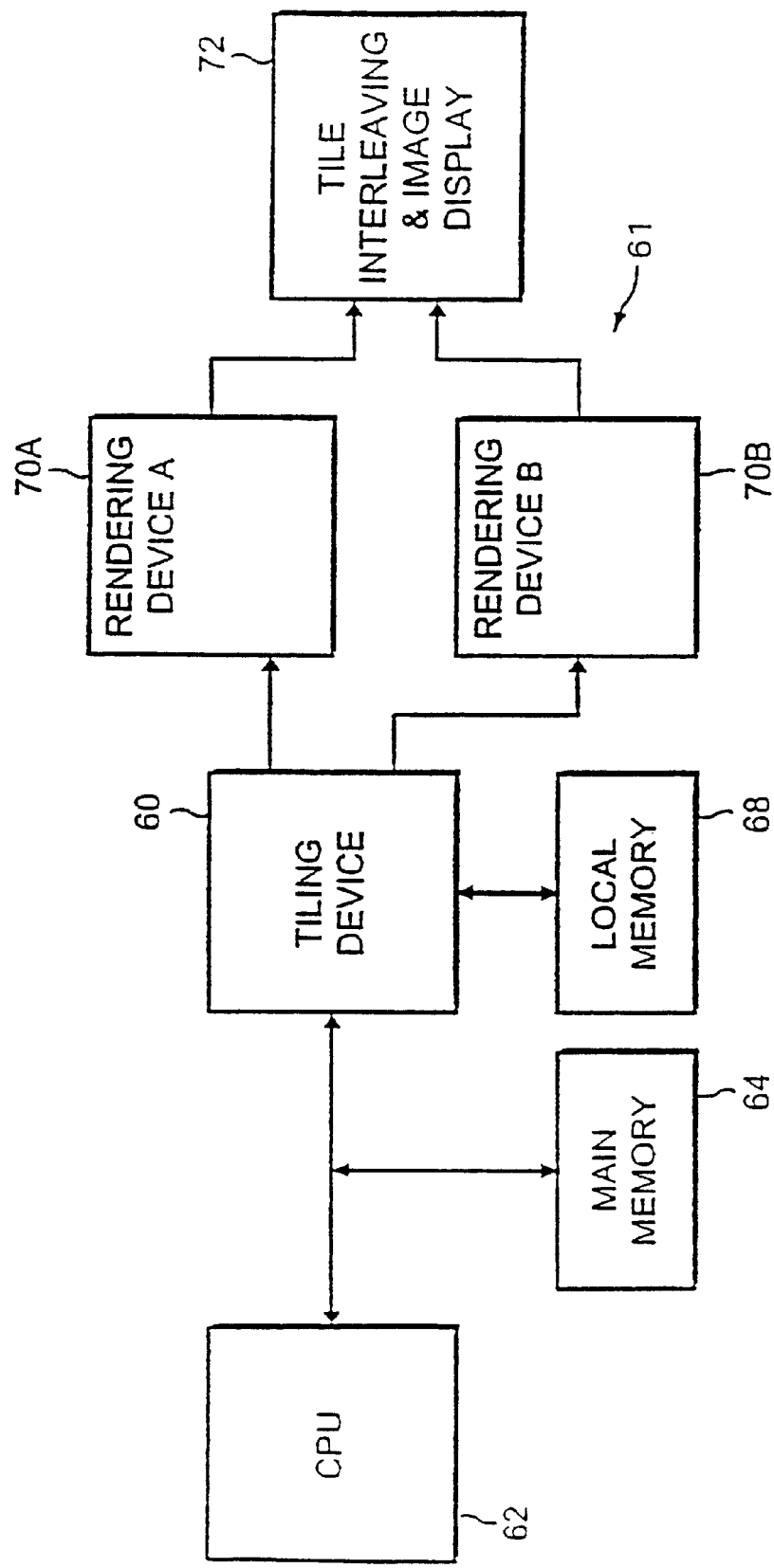
FIG. 6 is a block schematic diagram of hardware used in preferred image processing apparatus embodying the invention.

The hardware required for implementation of the embodiment described takes the form of that shown in FIG. 6. FIG. 6 shows in block schematic form image processing apparatus 61 embodying the invention and comprising a central processing unit (CPU) 62 connected to a main memory 64. A tiling device 60 defines the tiles and communicates with a local memory 68 as well as with the CPU 62. The tiling device effectively has two output ports to which are attached a first texturing or rendering device 70A and a second texturing or rendering device 70B. The outputs of the two rendering devices 70A and 70B are both applied to tile interleaving and image display circuitry 72. For further description of suitable hardware, reference may be made to our above-mentioned United States Patent, the significant point being that there are two rendering devices 70A, 70B connected in parallel between the tiling device 66 and the circuitry 72.

In practice the two outputs of the tiling device 66 may be connected by a single data bus together with appropriate addressing to identify a required one of the two rendering devices 70A, 70B.

The steps involved in the operation of the apparatus of FIG. 6 may be described in principle as follows:

1. Objects are generated by the user (programmer). They are defined by their vertices, and by texture codes which indicate the type of texturing required for each surface. This will include the color and other surface effects.
2. A bounding box is generated for each surface, following the method described above.
3. The bounding box is compared against the macro tiling pattern being employed, so as to determine which surfaces fall into which tiles, or sub-regions of the image and hence which of the multiple rendering devices (two in this case) require the data. Surface vertices and texture codes are then stored in the appropriate local memory portion associated with each rendering device.
4. At this stage a tile display list for each rendering device is generated, so that when each rendering 70A or 70B device operates, it only needs to traverse data for each of its tiles, and not the whole scene display list.
5. For each pixel of the tile, the surfaces are sorted by depth, with the nearest surfaces listed first.
6. The ray-casting method of the above-mentioned U.S. Patent is employed to find the front-most opaque surface which is seen at that particular pixel.
7. The thus-located front-most visible surfaces are then rendered, to provide the desired surface color, texture, and shading.
8. The resultant is stored in a display buffer.

In accordance with this invention, some of the above steps are executed by two processors operating in parallel. The operations are distributed between the two processors in the manner described above. That is to say, step 7 for some tiles (the light tiles as referred to above) is achieved by one processor and the same step for the other (dark) tiles is achieved by the other processor. This reduces the time required for processing by a factor less than but approaching a half. The outputs of the two processors are combined for application to the display buffer and subsequent display on the display screen.

It will therefore be seen that the system operates by supplying data defining a group of surfaces representing an object, e.g. the house or the bicycle in FIG. 2. The display is subdivided into a large number of tiles, and a determination is made as to which surfaces fall into which tiles. The data is then applied to the two rendering devices in dependence upon which tile the various surfaces fall into. The data of some surfaces will be sent to one rendering device only and the data of other surfaces will be sent to both rendering devices. More particularly, when the surface falls into one tile only, e.g. the roof or the door in FIG. 2, the data need only be sent to one rendering or texturing device. When the surface falls into two tiles being handled by the different rendering devices, the surface data must be sent to both rendering devices.

It may be that the surface falls into two tiles which are both handled by the same rendering device or processor, in which case, again, the data need be sent only to one rendering device. This is unlikely with the tile arrangement of FIG. 2, but could more easily happen with other arrangements.

The embodiments of the invention illustrated assume that there are two processors instead of the usual one to provide the rendering (texturing or shading for instance). However, the invention is not limited to the use of two devices; more than two may be used if desired, in which case the screen is split up into an appropriate larger number of regions each comprising a respective group of tiles.

The embodiments illustrated have the advantage that, assuming normal images are being processed, the processing time is reduced, due to the fact that the processors can operate simultaneously in parallel, each processor needing to process only some of the surfaces and not all the surfaces in the image.

it will be appreciated that many other modifications may be made to the system described and illustrated purely by way of example.

What is claimed is:

1. An image processing apparatus comprising:

means for supplying surface data defining a group of surfaces representing each object in an image to be displayed;

sub-division means coupled to said supply means and having a plurality of output ports for: sub-dividing the image into a plurality of sub-regions; receiving the surface data from said supply means; based on the surface data, determining which of the surfaces fall into each sub-region; and forwarding the surface data for each sub-region to at least one said output port, wherein:

each said output port is associated with a separate one of the image sub-regions;

if said sub-division means determines a specific surface falls into a single sub-region, said sub-division means forwards the data for the surface to only the output port associated with the sub-region; and if said sub-division means determines a specific surface falls into a plurality of sub-regions, said sub-division means forward the data for the surface to the outputs associated with the sub-regions in which that contain the surface;

a plurality of rendering devices, each said rendering device coupled to a separate one of said sub-division means output ports, each said rendering device configured to receive the surface data for the sub-region with which said rendering device is associated and, based on the received surface data, generate, for the sub-region, image-defining data; and combining means coupled to said plurality of rendering devices to receive from each said rendering device the sub-region image defining data for combining the sub-region image-defining data from said plurality devices into unified image data for application to a display.

2. The apparatus according to claim 1, in which there are only two said rendering devices.

3. The apparatus according to claim 2, wherein said sub-division means divides the sub-regions of the image into a checkerboard pattern.

4. The apparatus according to claim 1, wherein said sub-division means sub-divides the image into sub-regions that are rectangular, the rectangles having an aspect ratio of less than one to six.

5. The apparatus according to claim 1, wherein said sub-division means sub-divides the image into sub-regions that are rectangular, the rectangles having an aspect ratio of less than one to three.

6. The apparatus according to claim 1, wherein said sub-division means sub-divides the image into at least one sub-region that is square.

7. The apparatus according to claim 1, wherein said sub-division means sub-divides the image into at least one sub-region that is from 32 to 64 pixels in width and 32 to 64 pixels height.

8. The apparatus according to claim 1, in which said supply means comprises a CPU and a memory device.

9. The apparatus according to claim 1, in which said sub-division means has an associated memory means.

10. The apparatus according to claim 1, in which said sub-division means determines which surfaces may fall into which sub-region by determining, for each surface, a rectangular bounding volume and determining into which sub-regions of the image the bounding volume for the surface falls.

11. The apparatus according to claim 1, wherein each said rendering device is configured to:

based on the surface data received, sort the surfaces in the sub-region with which said rendering means is associated by depth to initially determine which surfaces are visible in the sub-region; and after the depth sorting, perform textural rendering of the visible surfaces.

12. The apparatus according to claim 1, wherein said means for supplying surface data supplies surface data that define the surfaces as surfaces of polygons.

13. The apparatus according to claim 1, wherein said sub-division means divides at least a portion of the image into a sub-region that consists of a first rectangular portion of the image minus the area of a second rectangular portion of the image that is contained within the first rectangular portion.

14. The apparatus according to claim 1, wherein said plurality of rendering devices are configured to operate simultaneously to simultaneously generate image-defining data for the separate sub-regions with which said rendering devices are associated.

* * * * *